United States Patent
Robertson

(10) Patent No.: US 6,453,598 B1
(45) Date of Patent: Sep. 24, 2002

(54) FISHING ROD HOLDER

(76) Inventor: Kelly W. Robertson, 2104 Cardinal La., Hendersonville, TN (US) 37075

( * ) Notice: Subject to any disclaimer, the term of this patent is extended or adjusted under 35 U.S.C. 154(b) by 0 days.

(21) Appl. No.: 09/617,863

(22) Filed: Jul. 17, 2000

(51) Int. Cl.⁷ .............................................. A01K 97/10
(52) U.S. Cl. ...................................................... 43/21.2
(58) Field of Search .......................... 43/21.2; D22/147

(56) References Cited

U.S. PATENT DOCUMENTS

| | | | | |
|---|---|---|---|---|
| 1,091,491 A | * | 3/1914 | Ebur | 248/515 |
| 3,964,706 A | * | 6/1976 | Adams | 43/21.2 |
| 4,763,435 A | * | 8/1988 | Deering | 43/21.2 |
| D330,753 S | * | 11/1992 | Gutierrez | D22/147 |
| 5,488,798 A | * | 2/1996 | Beachel | 43/21.2 |
| 5,937,564 A | * | 8/1999 | Perreault | 43/4.5 |
| 5,992,081 A | * | 11/1999 | Elkins | 43/21.2 |
| 6,128,848 A | * | 10/2000 | Wong | 43/21.2 |
| 6,213,441 B1 | * | 4/2001 | Baynard et al. | 248/538 |

* cited by examiner

Primary Examiner—Charles T. Jordan
Assistant Examiner—Jordan Lofdahl
(74) Attorney, Agent, or Firm—Stites & Harbison PLLC; Richard S. Myers, Jr.

(57) ABSTRACT

An adjustable fishing rod stand or holder or fishing rod/fishing rod holder combination is disclosed. The holder is preferably comprises an elongated base, and elongated arm, and a cradle. The elongated arm preferably has a first end and a second end with the first end being attached to the base, and the arm extending traversely from and being rotatable extendable relative to the base. The cradle is for receiving and supporting the fishing rod in a holding position. The cradle should be pivotally attached to the second end of the elongated arm, allowing the fishing rod holder to support the fishing rod in variable, inclined upright positions suitable for fishing. The fishing rod/fishing rod holder of the present invention may be used to support a fishing rod on any surface, and optionally remains attached to the rod when the user transports the rod or casts the fishing line.

24 Claims, 2 Drawing Sheets

FISHING ROD HOLDER

BACKGROUND OF THE INVENTION

Generally, this invention relates to a fishing rod holder and a fishing rod/fishing rod holder combination. The fishing rod holder and rod/holder combinations of the present invention support a fishing rod in an inclined, upright position suitable for fishing.

SUMMARY OF THE INVENTION

The present invention provides a novel, adjustable fishing rod stand or holder. The present invention further provides a novel fishing rod/fishing rod holder combination. The holder is preferably comprises an elongated base, and elongated arm, and a cradle. The elongated arm preferably has a first end and a second end with the first end being attached to the base, and the arm extending traversely from and being rotatable extendable relative to the base. The cradle is for receiving and supporting the fishing rod in a holding position. The cradle should be pivotally attached to the second end of the elongated arm, allowing the fishing rod holder to support the fishing rod in variable, inclined upright positions suitable for fishing.

Preferably, the cradle is partially circular in shape and has a top opening larger than the smaller diameter of a tapered fishing rod. The cradle preferably has an inside diameter smaller than the larger diameter of a tapered fishing rod. This configuration allows the tapered fishing rod to be received in the cradle and then snugly fill the cradle. Alternatively, the cradle may comprise a strap to receive and hold the fishing rod. In this configuration, the particular shape of the cradle is not critical as long as the cradle can receive and hold the fishing rod snugly when attached with the strap. The strap is also not known to be critical and may be, for instance, a hook and loop connector. Additionally, the cradle may clip or snap onto the fishing rod. The method of attachment of the fishing rod allows optional temporary to the pole. Therefore, a fishing rod holder of the present invention may be used on several different poles or several different fishing rod holders of the present invention may be used on the same pole.

In one embodiment of the invention, the elongated arm comprises a sleeve and a member. The sleeve has a larger diameter than the member which allows the sleeve to receive the member and allows the member to extend telescopically in relation to the sleeve as well as rotate in relation to the sleeve. This configuration allows the fishing rod holder to pivot, rotate and extend relative to a fishing pole.

In another embodiment of the present invention, the elongated arm may be tubular and attached perpendicularly to the base.

A fishing rod holder of a present invention preferably comprises traction pads on the base to increase the friction between the base and a surface that is supporting the fishing rod and the fishing rod holder. The traction pads may comprise a polymeric material.

In one embodiment of the present invention, the fishing rod holder further comprises a second fishing rod cradle spaced from the first fishing rod cradle that receives a fishing rod. The second cradle allows the fishing rod to be attached to the pole in a second position, allowing for easy transportation of the pole while connected to the fishing rod holder of the present invention. Preferably, the second fishing rod cradle is semi-circular in shape and receives the fishing rod through the opening of the semi-circle. Furthermore, the second fishing rod cradle preferably comprises flexible material allowing the opening to be smaller than the diameter of the point of the fishing rod received by the second cradle. Thus, the fishing rod is pushed through the flexible opening of a second cradle in a snap fashion. Additionally, the second cradle may be attach to the rod by some type of clip.

In one embodiment of the present invention, the base comprises at least hollow holder to engage a fishing hook attached to the fishing line of a fishing rod. This hook may be loop shaped or circular shaped or ring shaped allowing the hook to engage the hook holder through the hollow portion of the hook holder.

In one embodiment of the invention, the arm comprises measurement indicia allowing the user of the fishing rod holder to measure captured fish using the fishing rod holder of the present invention.

Another embodiment of the invention comprises a fishing rod and rod holder combination comprising a flexible, elongated fishing rod, an arm pivotally connected to a first point and connectable to a second point of the rod. The arm is telescopically extendable to provide support for the rod. A base is transversely connected to the arm and a cradle is provided for connectability of the arm and base to a second point of the rod. In this other embodiment, the cradle may be flexible and semi-circular in shape with the opening space being less than the diameter of the second point of the rod. This cradle may optionally comprise a strap connecting the cradle to the fishing rod.

In one embodiment of the present invention, the nature of the cradle or the nature of the attachment of the cradle to a fishing rod is not known to be critical. In this embodiment, any means may be used to attach the rod as long as it does not interfere with the pivoting, rotational, and telescopic movement of the rod holder relative to the fishing rod.

Furthermore, the base may contain a hollow fishing hook holders. In this embodiment, the arm and base support the rod in an inclined, upright position suitable for fishing. The base comprises pads to increase the co-efficient friction between the rod and the surface of the rod is resting upon.

The fishing rod holder of the present invention has many advantages over the prior art fishing rod holders. For instance, many prior art fishing rod holders comprise a stake that must be driven in the ground. For example, see U.S. Pat. No. 4,972,621 by Tucker. The fishing rod holder of the present invention, on the other hand, may be used on any surface such as rocks, a pier, or ice because it supports the rod in an inclined, upright position suitable for fishing without the need for being inserted into the surface it rests upon. Additionally, the fishing rod holder is advantageous over the prior art fishing rod holders in that the fishing rod holder of the present invention is not cumbersome to the user when a fish strikes or the user decides to change fishing locations. Whenever the user lifts the rod, the holder of the present invention remains attached to the rod. Accordingly, the user does not have to remove the rod from a holster-type holder or remove any straps to pickup the pole to reel in a captured fish. Additionally, when the user is ready to change fishing locations, the user only has to pick up the pole. The user is not required to separately remove the holder from the ground and/or separately transport the fishing rod holder. Additionally, the user is not required to remove the holder when casting the line. The holder may remain attached to the rod during casting.

BRIEF DESCRIPTION OF THE DRAWINGS

FIG. 4 is a view of a preferred embodiment of the fishing rod holder/fishing rod combination of the present invention.

DESCRIPTION OF THE PREFERRED EMBODIMENTS

Figure 1:
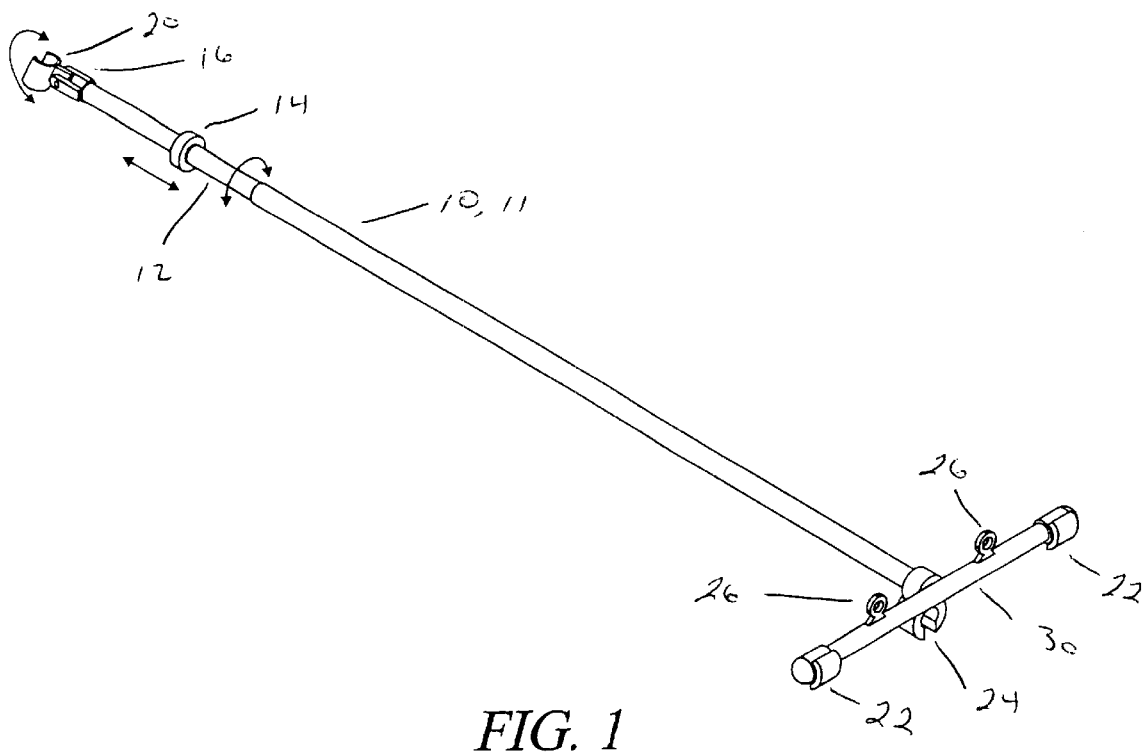
FIG. 1 is a view of the preferred embodiment of the fishing rod holder of the present invention.

FIG. 1 depicts a preferred embodiment of the present invention. The arm 10 is transversely connected to the base 30. In this particular embodiment, the arm 10 is connected perpendicularly to the base 30. The arm 10 is connected to a fishing pole by the cradle 20. The cradle 20 that is shown in FIG. 1 is partially circular in shape and has a top opening larger than the smaller diameter of a tapered fishing rod and an inside diameter smaller than the larger diameter of a tapered fishing rod so that a tapered fishing rod can be received in the cradle 20 and snugly fill the cradle 20.

The arm 10 also may be attached to a fishing rod by using a cradle 20 and a strap. In this embodiment, the cradle 20 may be partially circular in shape or partially square in shape. The nature of the strap is not critical as long as it snugly holds the cradle 20 against the pole. When a strap is used, the strap is preferably a hook and loop-type material. The cradle also may snap onto the pole.

The cradle 20 is connected to the arm 10 with a bracket 16 which allows pivotal movement of the arm 10 relative to the cradle 20 and fishing rod. As can be seen by the arrows in FIG. 1, the fishing rod holder of the present invention has pivotal, extendable and rotary motion as to the fishing rod. In the embodiment depicted by FIG. 1, the arm 10 comprises a sleeve 11 and member 12. The sleeve 11 has a larger diameter than the member 12 and thus receives the member 12 and allows the member 12 to extend telescopically in relation to the sleeve 11 and rotate in relation to the sleeve 11. A washer 14 is preferably used to control the extendable movement of the arm 10 within the sleeve 11. The base 30 comprises traction pads 22 to increase the co-efficient friction between the base 30 and a surface that is supporting the fishing rod in the fishing rod holder. These pads 22 are preferably some type of polymeric material. However, the nature of the pad 22 is not known to be critical as long as it helps to secure the fishing rod and fishing rod holder on a surface. For instance, different traction pads 22 may be used for different surfaces. That is, a user may use a certain traction pad 22 for ice fishing as opposed to fishing on a pier or fishing on a muddy river or lake bank. The base 30 also preferably comprises fishing hook holders 26 to secure a fishing hook when the fishing rod holder is attached to the fishing rod during transportation or storage. A second cradle 24 is spaced from the first fishing rod cradle 20 allowing the fishing rod holder of the present invention to be connected to the fishing rod in more than one place. When the holder is held to the fishing rod by the first and second cradle, it is easier to cast with the holder attached to the rod.

Figure 2:
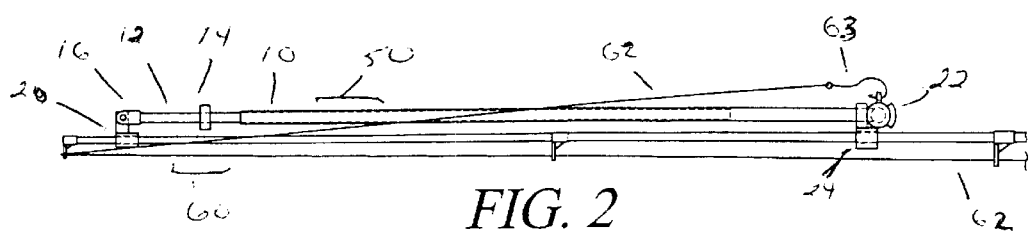
FIG. 2 is a view of the preferred embodiment of the fishing holder of the present invention connected to a fishing pole with the first and second cradles. Furthermore, a fishing hook is engaging the fishing hook holder attached to the base.

FIG. 2 depicts the fishing rod holder connected to the fishing rod in a storage or transportation configuration. The fishing rod holder is connected to the fishing rod 60 by using the first cradle 20 and the second cradle 24. A fishing hook 63 is being stored by engaging the fishing hook holder on the base of the fishing rod holder 50. A fishing hook is attached to a fishing line 62.

Figure 3:
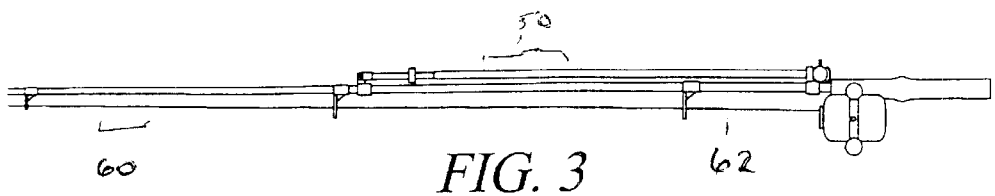
FIG. 3 is a view of the fishing rod holder of the present invention attached to a fishing pole.

FIG. 3 depicts the fishing rod holder of the present invention 50 attached to a fishing rod 60 by using the first and second cradle thus, allowing the user mobility when reeling in a captured fish or casting the fishing line 62 without having to remove the fishing rod holder of the present invention.

Figure 4:
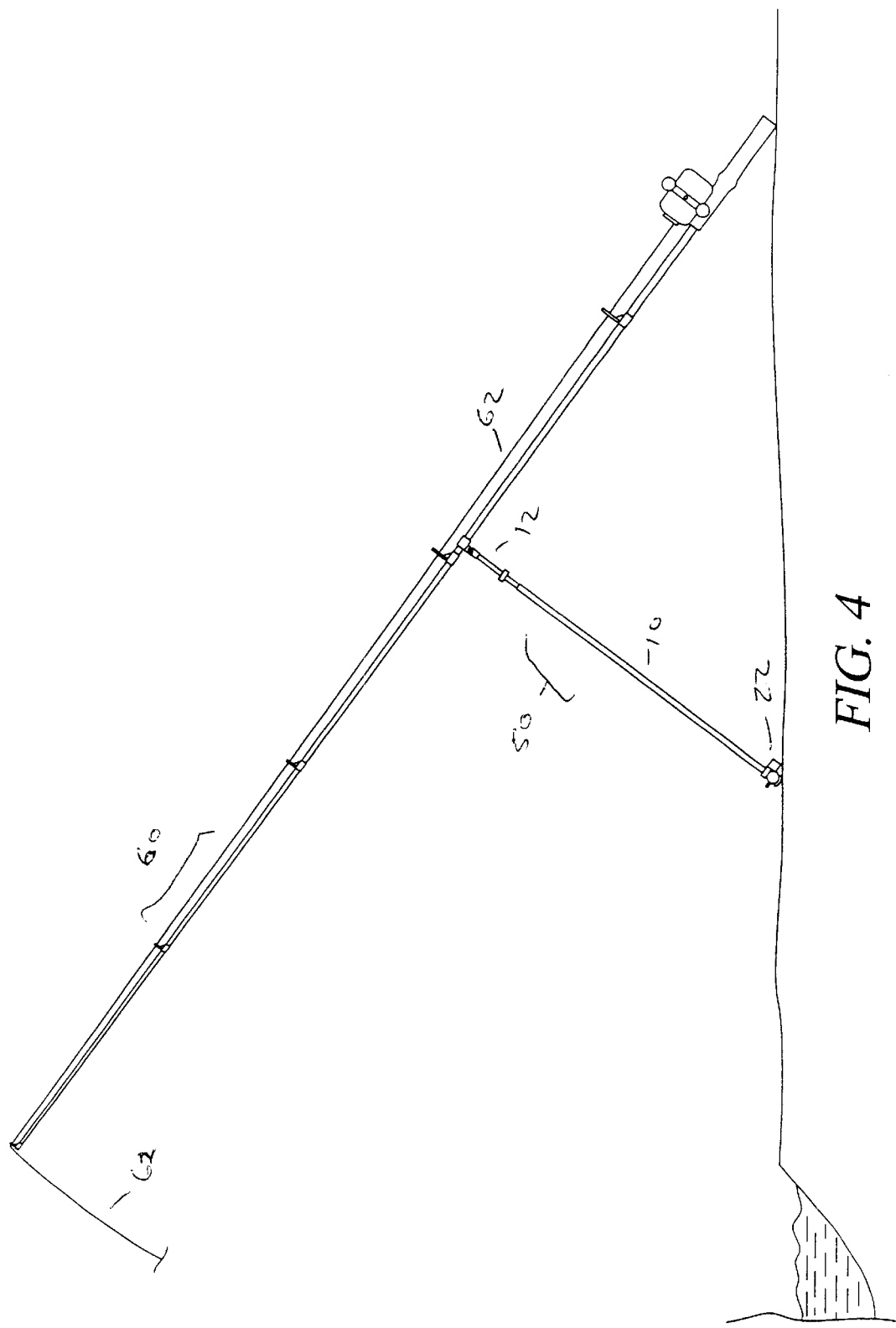
FIG. 4 is also a view of the preferred embodiment of the fishing rod holder of the present invention supporting a fishing rod in an inclined, upright position suitable for fishing. Additionally.

FIG. 4 depicts the fishing rod holder of the present invention 50 by supporting a fishing rod 60 in an inclined, upright position.

FIGS. 2, 3 and 4 are also similar to an embodiment of the present invention comprising a fishing rod and fishing rod holder combination. In this embodiment, the fishing rod holder described above is optionally permanently attached to the fishing rod where the first cradle would receive and hold the rod described above. As stated above, the nature of the attachment to the rod is not known to be critical in this embodiment, as long as the fishing rod/fishing rod holder combination functions substantially the same as the fishing rod holder of the present invention discussed above when attached to a fishing rod. That is, the holder portion will have the same functions and movement relative to the rod as discussed above.

The invention thus being described is obvious at numerous modifications and changes will occur to those of ordinary skill in the art. Therefore, the foregoing is considered as illustrative only for the principals of the present invention and is not desired to limit the invention to the exact construction and operation as shown and described above. Thus, all suitable modifications and equipment falls within the scope of the above described invention.

What is claimed is:

1. A fishing rod holder comprising:
   an elongated base;
   an elongated arm having a first end and a second end with the first end being attached to the base, and the arm extending traversely from and being rotatable and extendable relative to the base;
   a cradle for receiving and supporting the fishing rod in a holding position, said cradle being pivotally attached to the second end of the elongated arm, so that said fishing rod holder can support a fishing rod in an inclined, upright position; and
   wherein said cradle is generally cylindrical in shape and has a top fishing rod opening that is larger than the smaller diameter of a tapered fishing rod, and said cradle has an inside diameter smaller that the larger diameter of a tapered fishing rod, so that a tapered fishing rod can be received in the cradle and then snugly fill the cradle.

2. The fishing rod holder of claim 1, wherein said elongated arm comprises a sleeve and a member, said sleeve having a larger diameter than said member and thus receiving the member and allowing the member to extend telescopically in relation to the sleeve and rotate in relation to the sleeve.

3. The fishing rod holder of claim 1, wherein said elongated arm is tubular and attached perpendicularly to the base.

4. The fishing rod holder of claim 1, wherein said base comprises traction pads to increase the coefficient of friction between the base and a surface that is supporting the fishing rod and the fishing rod holder.

5. The fishing rod holder of claim 1, wherein said fishing rod holder further comprises a second fishing rod cradle spaced from the first fishing rod cradle that receives the fishing rod.

6. The fishing rod holder of claim 5, wherein said second fishing rod cradle is semicircular in shape and receives the fishing rod through the opening of the semicircle.

7. The fishing rod holder of claim 6, wherein said second fishing rod cradle comprises flexible material and said opening is smaller than the diameter of the point of the fishing rod received by the second cradle to allow the second cradle to hold the fishing rod.

8. The fishing rod of claim 1, wherein said base further comprises a hollow holder to engage a fishing hook attached to fishing line of a fishing rod.

9. The fishing rod holder of claim 4, wherein the traction pads comprise a polymeric material.

10. The fishing rod holder of claim 1, wherein the arm comprises measurement indicia.

11. A fishing rod holder, comprising:
- an elongated base to support the fishing rod holder and a fishing rod by resting on a surface;
- an elongated, tubular-shaped hollow sleeve attached perpendicularly to the base;
- an elongated, tubular-shaped arm received by the sleeve to allow rotation and telescopic extension of the arm as to the base; and
- a cradle for receiving and holding a fishing rod, said cradle being pivotally attached to the arm;
- wherein said holder is adapted to support a fishing rod in an inclined, upright position.

12. The fishing rod holder of claim 11, wherein the cradle is partially circular in shape and has a top opening larger than the smaller diameter of a tapered fishing rod, and the cradle has an inside diameter smaller than the larger diameter of the tapered fishing rod, so that the rod can be received in the cradle and then snugly fill the cradle.

13. The fishing rod holder of claim 11, wherein said fishing rod holder comprises a second cradle for holding a fishing rod spaced from the first cradle.

14. The fishing rod holder of claim 11, wherein the base further comprises traction pads to increase the coefficient of friction between the holder and the surface the holder is holding a fishing rod upon.

15. The fishing rod holder of claim 11, wherein the base further comprises receptacles to hold fishing hooks associated with fishing line from a fishing rod.

16. The fishing rod holder of claim 18, wherein said receptacles are ring-shaped.

17. The fishing rod holder of claim 11, wherein said sleeve and arm comprise measurement indicia.

18. A fishing rod and rod holder combination, comprising:
- a flexible, elongated rod;
- an arm pivotally connected to a first point and connectable to a second point of the rod, said arm being telescopically extendable to provide support for said rod;
- a base transversely connected to said arm; and
- a cradle for connectability of the arm and base to a second point of the rod.

19. The combination of claim 18, wherein said cradle is flexible and semi-circular in shape with the opening space being less than the diameter of the second point of the rod.

20. The combination of claim 18, further comprising a strap connecting the cradle to the fishing rod.

21. The combination of claim 18, wherein the arm comprises measurement indicia.

22. The combination of claim 18, wherein said base comprises a hollow fishing hook holder.

23. The combination of claim 18, wherein the base comprises pads to increase the coefficient of friction between the rod and the surface the rod is resting upon.

24. The combination of claim 18, wherein the arm and base support the rod in an inclined, upright position.

* * * * *